June 2, 1936.  C. L. KNAPP  2,042,605
TRAP HOLDER FOR MILK AND OTHER BOTTLES
Filed Feb. 15, 1936   3 Sheets-Sheet 1
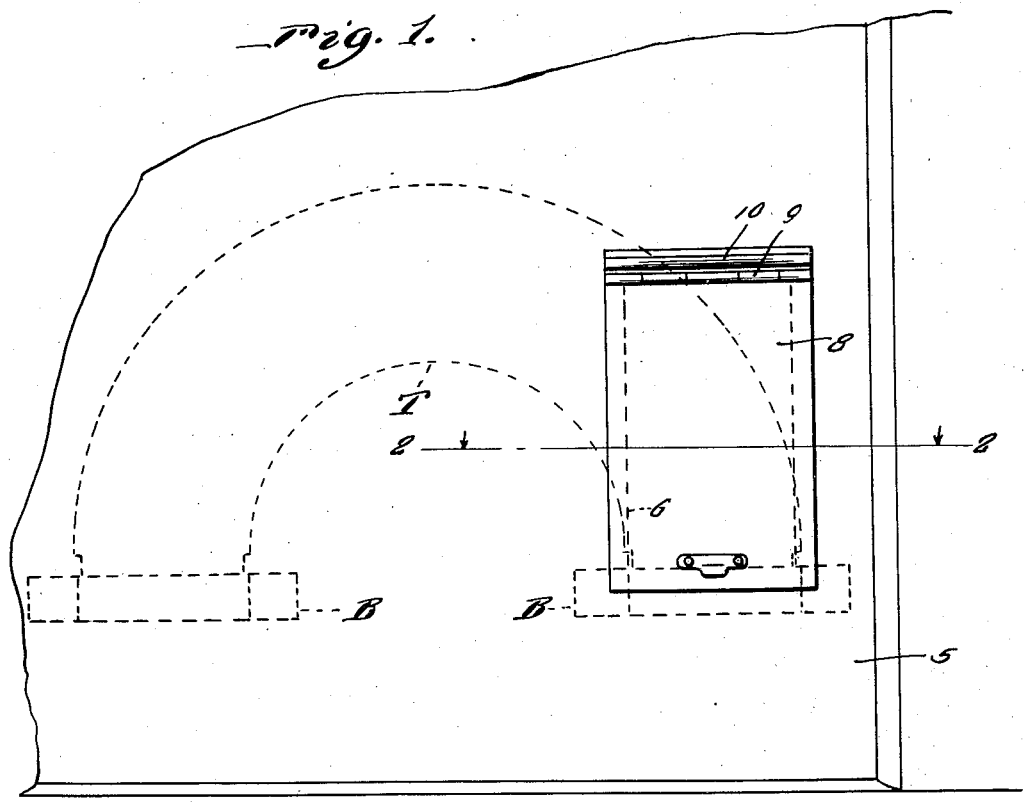
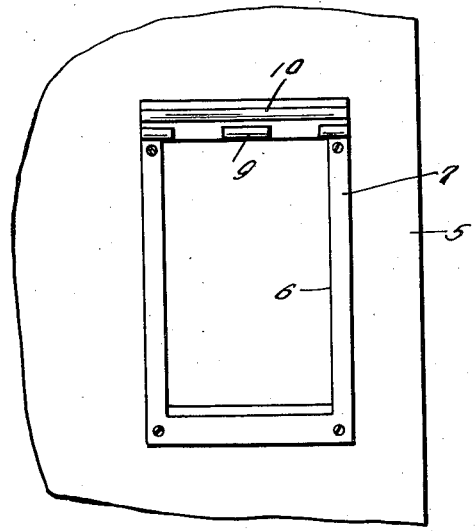
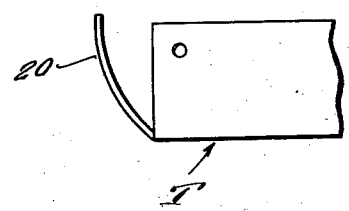
Inventor
C. L. Knapp
By Clarence A. O'Brien
Attorney June 2, 1936.   C. L. KNAPP   2,042,605
TRAP HOLDER FOR MILK AND OTHER BOTTLES
Filed Feb. 15, 1936   3 Sheets-Sheet 2
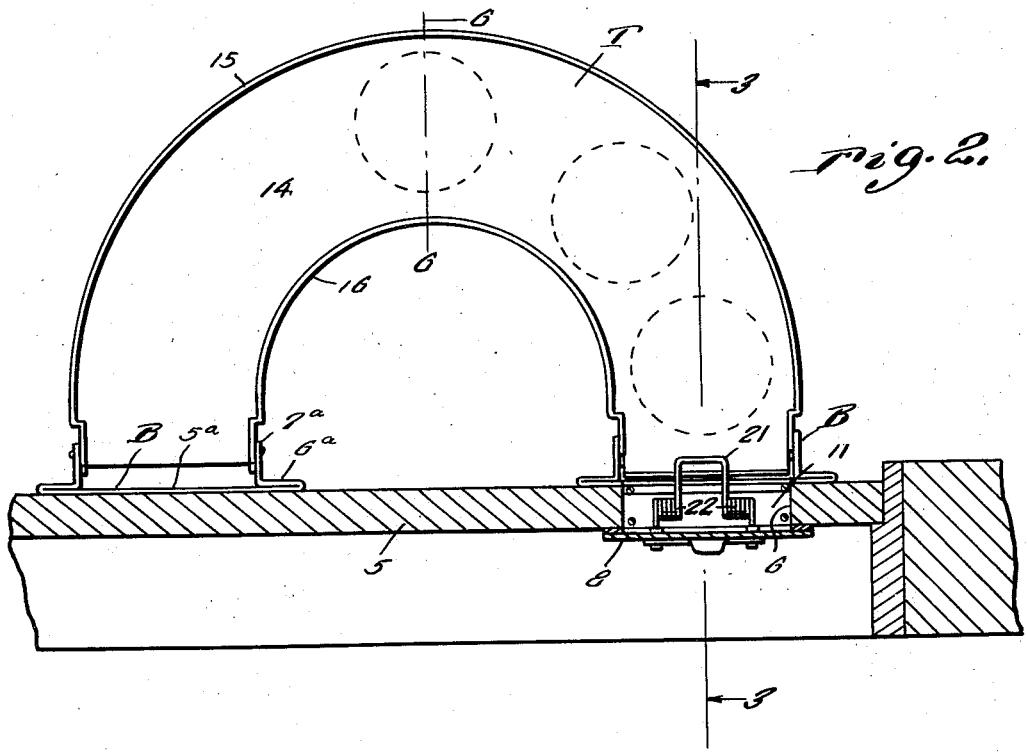
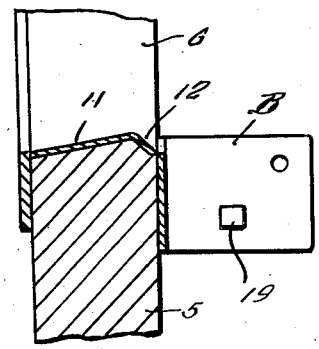
Inventor
C. L. Knapp
By Clarence A. O'Brien
Attorney June 2, 1936.  C. L. KNAPP  2,042,605
TRAP HOLDER FOR MILK AND OTHER BOTTLES
Filed Feb. 15, 1936   3 Sheets-Sheet 3

Inventor
C. L. Knapp
By Clarence A. O'Brien
Attorney

Patented June 2, 1936

2,042,605

UNITED STATES PATENT OFFICE 2,042,605

TRAP HOLDER FOR MILK AND OTHER BOTTLES

Charles L. Knapp, Shenandoah, Pa.

Application February 15, 1936, Serial No. 64,115

3 Claims. (Cl. 20—1.11)

The present invention relates to a trap holder for milk and other bottles and has for its prime object to provide a structure which may be incorporated in a door or the like whereby milk may be delivered to the occupant of a house or the like without the necessity of opening the door and in such a manner that the milk bottles will be left inside the house or the like and the device includes means whereby the door to the entrance to the device will be automatically locked.

With the above and numerous other objects in view as will appear as the description proceeds, the invention consists in certain novel features of construction, and in the combination and arrangement of parts as will be hereinafter more fully described and claimed.

In the drawings:

Figure 1 is an outside fragmentary elevation of a door showing my device incorporated therein.

Figure 2 is a sectional view taken substantially on the line 2—2 of Figure 1 looking downwardly.

Figure 5 is a detail section taken substantially on the line 5—5 of Figure 3.

Figure 6 is a detail sectional view taken substantially on the line 6—6 of Figure 2.

Figure 7 is a detail section taken substantially on the line 7—7 of Figure 4.

Figure 8 is a fragmentary elevation of the door showing the opening therein and the frame mounted on the opening for receiving the closure panel.

Figure 9 is a fragmentary side elevation showing one end of the tray.

Figures 3, 4:
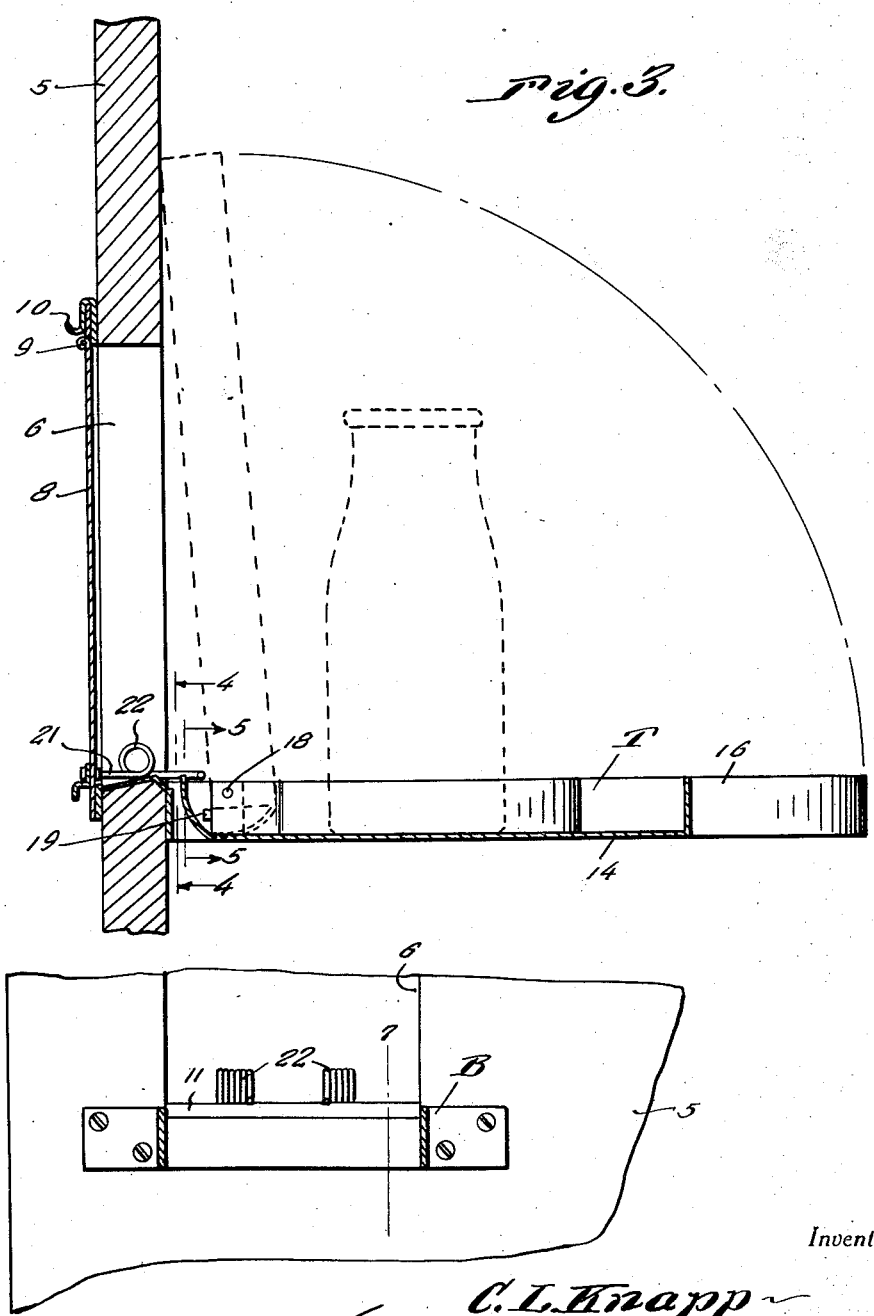
Figure 3 is a sectional view taken substantially on the line 3—3 of Figure 1.
Figure 4 is a detail sectional view taken substantially on the line 4—4 of Figure 3.

Referring to the drawings in detail, it will be seen that numeral 5 denotes a door, a wall panel or the like having therein an upright rectangular opening 6. On the outside of the door 5 about the opening 6 is a frame 7 fixed thereto. A closure panel 8 is hingedly connected to the upper portion of the frame 7 as indicated at 9 and above the hinge is formed a trough or setter 10. The bottom edge of the opening has a ledge plate thereon a portion 11 of which inclines upwardly and inwardly and merges into a sharply downwardly and inwardly inclined section 12. On the inside of the door immediately below the opening 6 there is located a bracket B. This bracket B is identical with another bracket B mounted on the door in spaced relation to the first mentioned bracket B and at the same level. Each bracket B is formed from a single elongated sheet of metal bent to provide an elongated straight portion 5a fixed to the door and merging at its ends in inwardly directed extensions 6a overlapping the straight portion 5a and terminating in right angularly extending inwardly disposed ears 7a.

The letter T' denotes generally a semi-circular tray having a bottom 14, an outer side 15 and an inner side 16. The extremities of the tray are reduced in width as will be apparent from an inspection of Figure 2 and are disposed between the two pairs of ears 7a and are pivotally connected thereto as indicated, in Figure 3, at 18. The ears have inwardly directed stops 19 to engage the end edges of the walls 15 and 16 for holding the tray in a horizontal position shown in Figures 2 and 3 but the tray may be swung up to a position where it leans against the door 5 as shown in dotted lines in Figure 3. This is the position, of course, when the tray is not in use. The end of the tray, adjacent the opening 6 is provided with an upwardly curved locking tongue 20 which is engageable in a loop 21 fixed to the inside of the bottom portion of the closure panel 8 for locking this closure panel. In order that the loop may easily spring over the tongue it is provided on each side with coils 22.

With the tray in the dotted line position shown in Figure 3 it will be seen that the panel 8 may be swung to open position and the milkman or the like may swing the tray down to its horizontal position and place the milk bottles thereon, one milk bottle pushing the other milk bottle around the tray and when the panel 8 is closed after the delivery of the bottles said panel is locked and can no longer be opened from the outside.

It is thought that the construction, operation, utility and advantages of this invention will now be clearly understood without a more detailed description thereof. It will be appreciated that I have devised a device which is simple in construction, comparatively inexpensive to manufacture and install, easy to manipulate, thoroughly efficient and reliable in use.

Numerous changes in the details of construction, and in the combination and arrangement of parts may be resorted to without departing from the spirit or scope of the invention as hereinafter claimed or sacrificing any of its advantages.

Having thus described my invention what I claim as new is:

1. In combination, a wall having an opening, a closure panel on one side of the wall for the opening hingedly mounted at the upper end thereof, an arcuate tray, means for hingedly mounting the ends of the arcuate tray on the other side of the wall below the opening, one end immediately below the opening and the other spaced laterally therefrom, said means including stops whereby the tray may be disposed in a substantially horizontal position and may be swung to an upright position leaning against the inner side of the wall, and means on the tray cooperating with additional means on the closure panel whereby when the tray is in a horizontal position said closure panel cannot be opened from the outside.

2. In combination, a wall having an opening, a closure panel on one side of the wall for the opening hingedly mounted at the upper end thereof, an arcuate tray, means for hingedly mounting the ends of the arcuate tray on the other side of the wall below the opening, one end immediately below the opening and the other spaced laterally therefrom, said means including stops whereby the tray may be disposed in a substantially horizontal position and may be swung to an upright position leaning against the inner side of the wall, means on the tray cooperating with additional means on the closure panel whereby when the tray is in a horizontal position said closure panel cannot be opened from the outside, said means on the door being in the form of a spring loop extending inwardly from the lower portion thereof and said means on the tray being in the form of a tongue engageable in the loop when said tray is in a substantially horizontal position.

3. In combination, a wall having an opening, a closure panel on one side of the wall for the opening hingedly mounted at the upper end thereof, an arcuate tray, means for hingedly mounting the ends of the arcuate tray on the other side of the wall below the opening, one end immediately below the opening and the other spaced laterally therefrom, said means including stops whereby the tray may be disposed in a substantially horizontal position and may be swung to an upright position leaning against the inner side of the wall, means on the tray cooperating with additional means on the closure panel whereby when the tray is in a horizontal position said closure panel cannot be opened from the outside, said means on the door being in the form of a spring loop extending inwardly from the lower portion thereof and said means on the tray being in the form of a tongue engageable in the loop when said tray is in a substantially horizontal position, said means for hingedly mounting the tray being in the form of a pair of brackets, each bracket comprising an elongated strip having a straight intermediate portion fixed to the wall and having extensions bent over the ends thereof extending inwardly toward each other and merging into right angularly inwardly disposed ears pivotally connected to the tray.

CHARLES L. KNAPP.